(12) United States Patent
Eaton (10) Patent No.: US 9,727,100 B1
(45) Date of Patent: Aug. 8, 2017

(54) POWER DISTRIBUTION UNIT/POWER OUTLET UNIT FOR A DISTRIBUTED COMPUTING SYSTEM

(71) Applicant: VCE Company, LLC, Richardson, TX (US)

(72) Inventor: Alva B. Eaton, Nottingham Park, IL (US)

(73) Assignee: VCE IP Holding Company LLC, Richardson, TX (US)

( * ) Notice: Subject to any disclaimer, the term of this patent is extended or adjusted under 35 U.S.C. 154(b) by 0 days.

(21) Appl. No.: 14/932,306

(22) Filed: Nov. 4, 2015

(51) Int. Cl.
*G06F 1/18* (2006.01)

(52) U.S. Cl.
CPC .................................... *G06F 1/189* (2013.01)

(58) Field of Classification Search
CPC . G06F 1/188; G06F 1/189; G06F 1/26; G06F 1/263; G06F 1/266; H05K 7/1492
USPC ...................... 361/601, 622; 713/300; 211/26
See application file for complete search history.

(56) References Cited

U.S. PATENT DOCUMENTS

| | | | |
|---|---|---|---|
| 2004/0228087 A1* | 11/2004 | Coglitore | G06F 1/189 361/679.46 |
| 2005/0093376 A1* | 5/2005 | Cleveland | H02G 3/00 307/147 |
| 2005/0259383 A1* | 11/2005 | Ewing | H02B 1/306 361/622 |
| 2007/0217128 A1* | 9/2007 | Johnson | H05K 7/1492 361/622 |
| 2008/0093927 A1* | 4/2008 | Ewing | H05K 7/1492 307/23 |
| 2009/0234512 A1* | 9/2009 | Ewing | H04L 12/10 700/295 |
| 2009/0242265 A1* | 10/2009 | Doorhy | H05K 7/1457 174/494 |
| 2011/0136353 A1* | 6/2011 | Spitaels | H01R 25/003 439/95 |
| 2013/0194726 A1* | 8/2013 | Bailey | H05K 7/1492 361/637 |
| 2013/0196535 A1* | 8/2013 | Utz | H01R 23/6866 439/536 |
| 2015/0177797 A1* | 6/2015 | Butzer | G06F 1/26 713/300 |

* cited by examiner

*Primary Examiner* — Anthony Haughton
*Assistant Examiner* — Yahya Ahmad
(74) *Attorney, Agent, or Firm* — Polsinelli PC (57) ABSTRACT

A power unit includes a power distribution member and an interchangeable adapter configured to be deployed in an equipment rack of a distributed computing system. The power distribution member includes multiple power outlets to provide electrical power to a plurality of devices disposed in the equipment rack at a first current rating and phase type configuration, and a first connector having a plurality of first electrical contacts that are electrically coupled to the power outlets. The interchangeable adapter includes a second connector to be coupled to the first connector in which the second connector has multiple second contacts that are arranged to mate with certain ones of the first electrical contacts such that one of a plurality of different electrical power sources having a second current rating and phase type configuration is provided to the power outlets at the first current rating and phase type configuration.

19 Claims, 9 Drawing Sheets

POWER DISTRIBUTION UNIT/POWER OUTLET UNIT FOR A DISTRIBUTED COMPUTING SYSTEM

TECHNICAL FIELD

Aspects of the present disclosure relate to computing systems and, in particular, to a power distribution unit/power outlet unit (PDU/POU) for a distributed computing system.

BACKGROUND

Many large scale Computing systems, such as computer clusters, computer security and storage arrays, and converged infrastructures, are often configured in equipment racks to provide a standardized physical structure for housing and protecting the computing equipment devices used by the computing system. Equipment devices configured for placement within racks are generally referred to as rack-mount systems, rack-mounted chasses, rack-mounted instruments, and the like. These racks typically include two side walls that are configured with rails onto which the equipment devices may be mounted, and doors on either the front and/or back side of the rack for enclosing the computing equipment devices thus forming a plenum for the movement of air through the rack for cooling the computing equipment devices.

SUMMARY

According to one aspect, a power unit includes a power distribution member and an interchangeable adapter configured to be deployed in an equipment rack of a distributed computing system. The power distribution member includes multiple power outlets to provide electrical power to a plurality of devices disposed in the equipment rack at a first current rating and phase type configuration, and a first connector having a plurality of first electrical contacts that are electrically coupled to the power outlets. The interchangeable adapter includes a second connector to be coupled to the first connector in which the second connector has multiple second contacts that are arranged to mate with certain ones of the first electrical contacts such that one of a plurality of different electrical power sources having a second current rating and phase type configuration is provided to the power outlets at the first current rating and phase type configuration.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Aspects of a power distribution unit/power outlet unit (PDU/POU) described herein provides an adaptable power distribution solution for distributed computing systems, such as computer clusters, converged infrastructures, computer grids, and the like that are configured in equipment racks. While conventional PDU/POUs implemented in equipment racks provide a mechanism for distributing electrical power to devices deployed inside, those conventional PDU/POUs, in many cases, are difficult to remove and/or replace once the equipment racks are populated with equipment devices. Embodiments of the PDU/POU according to the teachings of the present disclosure includes multiple types of interchangeable adapters that are each adapted to support varying types of electrical power sources and are easily changeable without necessitating removal of some, most, or all equipment devices configured in the equipment rack.

Currently, equipment racks are deployed with PDU/POUs that are designed specifically to match the available source of power at the customer site. Conventional PDU/POUs are typically built with specific power requirements and cannot be easily reconfigured at the customer site. When the PDU/POUs do not match the available source of power, the source of power must be changed, or the PDU/POUs exchanged with a suitable one. The latter option being the preferred one as changing to another available source of power is difficult if not impossible. For example, if 30 ampere, single phase power is available at a customer site, but the equipment rack has been implemented with PDU/POUs designed for 6t0 ampere, three-phase delta configuration, the equipment rack cannot be deployed with significant modification.

Rack design has evolved over time to provide several benefits for the operation of the computing systems that they house. Nevertheless, the relatively dense packaging of computing equipment devices provided by modern rack designs has presented challenges for their use. For example, most large scale computing systems are designed to be extensible or expandable so that additional computing equipment devices may be added as the needs of their users grow over time. Currently implemented rack designs, however, are often not well suited for the addition of computing equipment devices after the computing system has been placed in service. Additionally, unique power distribution units (PDU/POUs) are often required for each type of power source to support the relatively large variations in product configurations across the world in which variations in the type of power sources may vary greatly.

Distributed computing systems typically include multiple equipment devices (e.g., compute resources, networking resources, and storage resources) that are housed in an equipment rack, which may also be referred to as a cabinet or a housing. Electrical power is often distributed from an electrical power source to the equipment devices by a power distribution unit/power outlet unit (PDU/POU). Current trends in the implementation of distributed computing systems typically involve installing the equipment devices in an equipment rack at a manufacturing site and shipping the distributed computing system to a deployment site (e.g., customer site) in its essentially completed form. That is, most or all of the equipment devices to be implemented in the distributed computing system are installed at the manufacturer site and delivered to the deployment site in a manner that may require relatively few additional hardware modifications, such as installation of additional equipment devices, or removal of existing equipment devices. Nevertheless, many deployment sites at which these distributed computing systems may be deployed often have electrical power source configurations that may differ from site to site. These sources of electrical power may vary according to their rated current rating and number of phases. Examples of typically available sources of power may include a 30 ampere single phase configuration, a 60 ampere three phase delta configuration, and a 32 ampere three phase wye configuration.

Each distributed computing system is often custom built according to customer specifications and may include specifications for the type of electrical power source to be used for powering the equipment devices in the distributed computing system. In many cases, however, the type of electrical power source is not clearly relayed from the customer to the manufacturer when the distributed computing system is ordered. In such cases, the custom built distributed computing system, which is configured to use one type of electrical power, may arrive at a deployment site having a PDU/POU that is not adapted to work with the available source of electrical power. To solve such a problem using conventional approaches, the type of electrical power source may be changed to match the PDU/POU, or the PDU/POU may be replaced with another that is configured to accept the available source of electrical power. Nevertheless, both of these options are cumbersome and difficult to implement. For example, in many cases, the deployment site may not have an electrical power configuration that matches the type of PDU/POU implemented in the distributed computing system. On the other hand, replacing the existing PDU/POU in the distributed computing system often requires significant de-installation and re-installation of certain equipment devices in order to access the PDU/POU being replaced.

Figure 1:
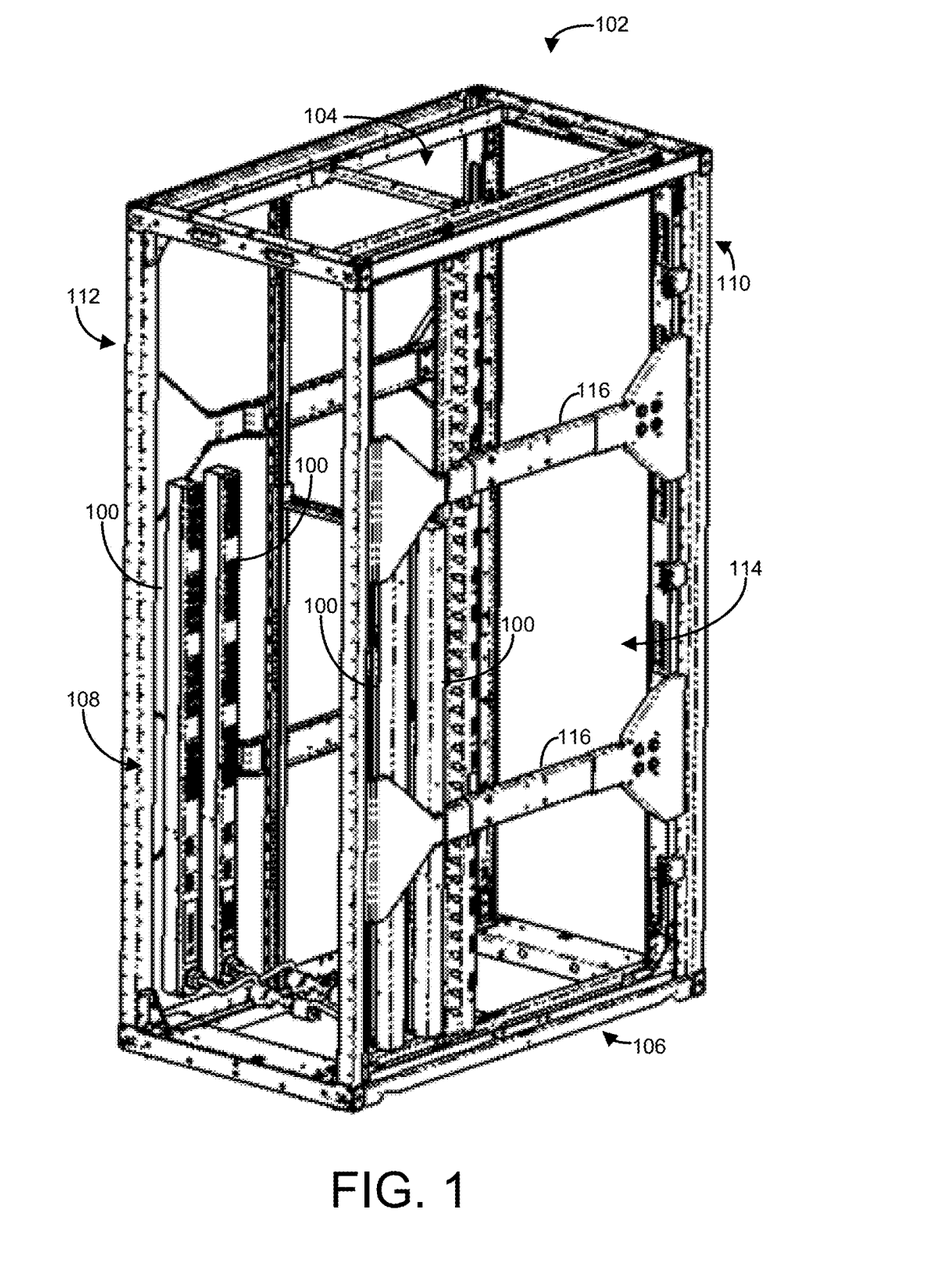
FIG. 1 illustrates several example power distribution unit/power output units (PDU/POUs) implemented in an equipment rack of a distributed computing system according to one embodiment of the present disclosure.

FIG. 1 illustrates four PDU/POUs 100 implemented in an equipment rack 102 according to one embodiment of the present disclosure. More specifically, FIG. 1 illustrates an isometric view of four PDU/POUs 100 implemented in the equipment rack 102. In this particular example, the equipment rack 102 is configured with two pairs of PDU/POUs 100. In other implementations, however, the equipment rack 102 may be configured with any quantity of PDU/POUs 100, such as more than two pairs of PDU/POUs 100, or only one pair of PDU/POUs 100.

Generally speaking, the equipment rack 102 includes a frame with a top side 104, a bottom side 106, a front side 108, a back side 110, a left side 112, and right side 114. The frame also includes strut members 116 configured along the left side 112 and right side 114 for supporting one or more equipment devices, such as those that may be configured in blade arrays, within the frame. The equipment rack 102 may also include one or more panels (not shown) for covering the frame and for providing a plenum for the efficient movement of cooling air through the equipment rack. Although two strut members 116 are shown, the equipment rack 102 may include any quantity of strut members 116 suitable for placement of equipment devices (e.g., a blade array enclosure, etc.) inside of the equipment rack 102.

In one embodiment, the equipment rack 102 is configured to house the equipment devices of a distributed computing environment. Examples of such equipment devices may include, blades, servers, or other equipment devices. However, the equipment devices are not shown in FIG. 1 to not unnecessarily obscure the PDU/POUs 100. The equipment devices may also include other communication devices, such as switches, routers, firewall appliances, or other communication devices. Additionally, the computing environment may comprise one or more converged infrastructures configured in a cloud computing environment.

Figure 2A:
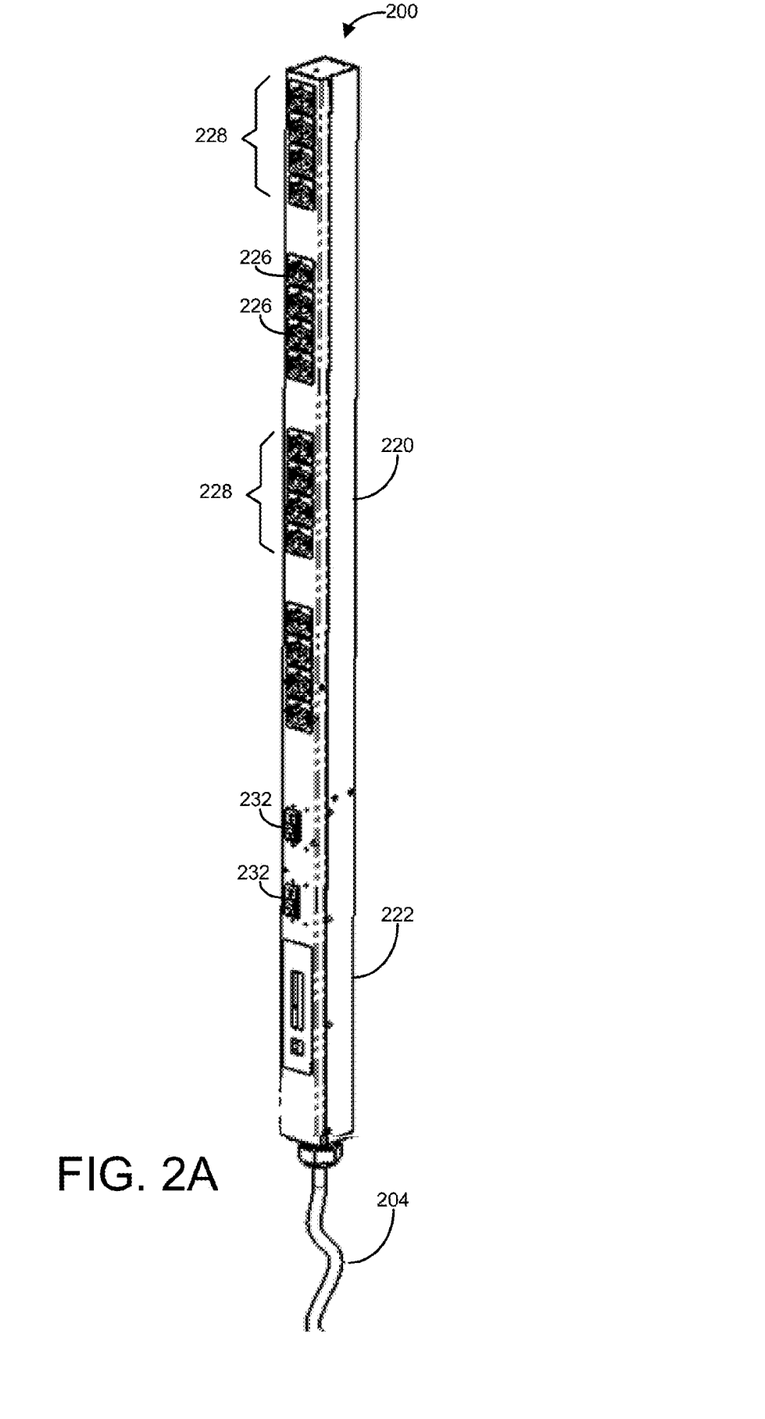
FIGS. 2A and 2B illustrate various aspects of another example PDU/POU according to one embodiment of the present disclosure.
Figure 2B:
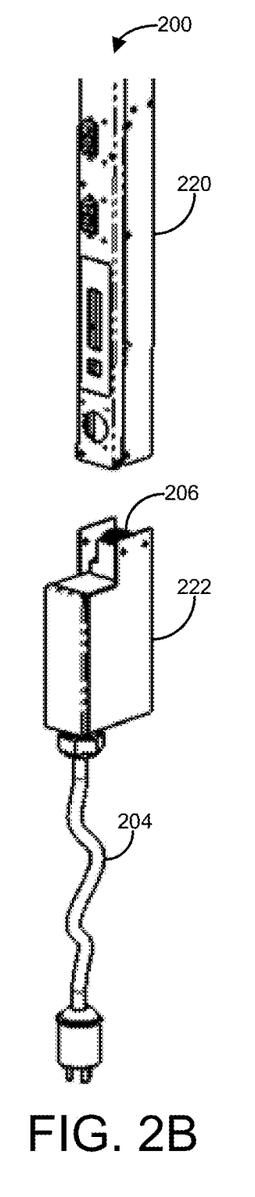

FIGS. 2A and 2B illustrate various aspects of another example PDU/POU 200 according to one embodiment of the present disclosure. The PDU/POU 200 includes a power distribution member 220 and an interchangeable adapter 222. In particular, FIG. 2A shows the PDU/POU 200 with the adapter 222 engaged on the power distribution member 220, while FIG. 2B shows a portion of the PDU/POU 200 with the adapter 222 removed from the power distribution member 220. The PDU/POU 200 includes a power cord 204 for electrical coupling to a suitable power source. Additionally, the adapter 222 includes a connector 206 (See FIG. 2B) that is used for electrical releasable coupling to a complementary connector as will be described in detail below with respect to FIG. 4. The PDU/POU 200 of FIGS. 2A and 2B differ from the PDU/POU 100 of FIG. 1 in that the power cord extends vertically below the power distribution member 222, while the power cord of the PDU/POU of FIG. 1 extends horizontally from the power distribution member.

The adapter 222 may be releasably coupled to the power distribution member 220 in any suitable manner. For example the adapter 222 may be releasably secured to the power distribution member 220 via one or more screws. Another example releasable securement mechanism may include a snap fit mechanism that causes the adapter 222 to be snapped into position when secured to the power distribution member 220. Other example releasable securement mechanisms may include, but are not limited to, friction fit mechanism, a sliding engagement mechanism.

In one embodiment, the adapter 222 is configured on the PDU/POU 200 proximate the bottom side 106 of the equipment rack 102. In other embodiments, the adapter 222 may be configured at any location along the PDU/POU 200, such as proximate the top side of the equipment rack 102, or in the middle of the equipment rack 102. In many cases, the middle portion of the equipment rack 102 is populated with equipment devices having numerous cabling structures interconnecting certain equipment devices with other equipment devices, thus making the middle portion of the equipment rack 102 relatively difficult to access. By placing the adapter 222 proximate the bottom side 106 of the equipment rack 102, the adapter 222 may be easily accessed for its removal and/or replacement without undue hindrance from any installed equipment devices or cabling structures configured in the equipment rack 102. Additionally, placement of the adapter 222 proximate the bottom side 106 of the equipment rack 102 may provide for relatively efficient interconnection with an electrical power source when the equipment rack 102 is deployed on top of an elevated floor and the electrical power source is accessed from within a cavity formed below the elevated floor.

The power distribution member 220 includes multiple power outlets 226 to provide electrical power to the equipment devices disposed in the equipment rack 102. In one embodiment, one or more of the power outlets 226 comprises a National Electrical Manufacturers Association (NEMA) 5 connector configured to provide 120 volt, single phase power, supporting up to a 30 ampere capacity using three contacts (e.g., hot, neutral, and ground). Nevertheless, any type of power outlet 226 may be used having a form compatible with the equipment devices it is configured to provide electrical power for. The power distribution member 220 may also include one or more breakers 232 that serve as overload protection for the equipment devices in the equipment rack 102.

In one embodiment, the power outlets 226 are arranged in groups according to the power needs of various zones or regions in the equipment rack 102. In the particular example shown, four groups 228 of power outlets 226 are provided each having four power outlets 226. Nevertheless any quantity of groups 228 may be provided without deviating from the spirit and scope of the present disclosure. The zones generally refer to a physical space in the equipment rack 102 where certain equipment devices having specific power needs are usually disposed. For example, a first group 228 of power outlets 226 may be provided for a physical region in the equipment rack 202 where a blade array enclosure housing is typically installed in which the power outlets 226 are a type that is compatible with the plug type and current/phase type to be used by the blade array, while a second group 228 of power outlets 226 may be provided for another physical region in the equipment rack 102 to support the specific power requirements of a storage array.

Figure 3A:
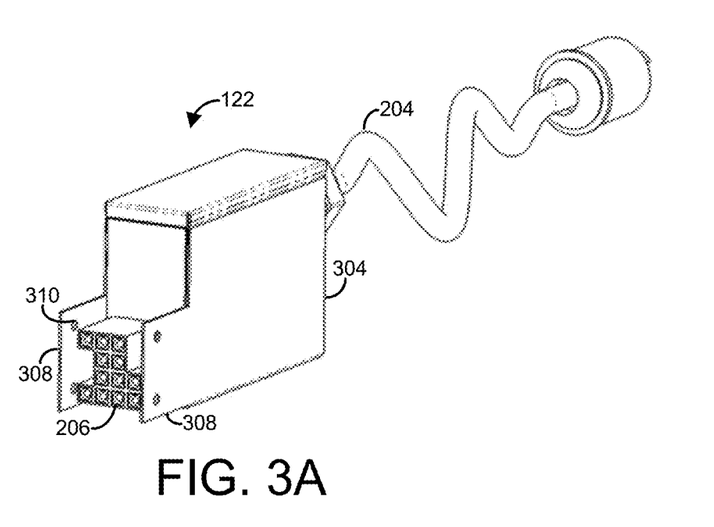
FIGS. 3A and 3B illustrate various aspects of the adapter of FIGS. 2A and 2B that has been removed from the power distribution member according to one embodiment of the present disclosure.
Figure 3B:
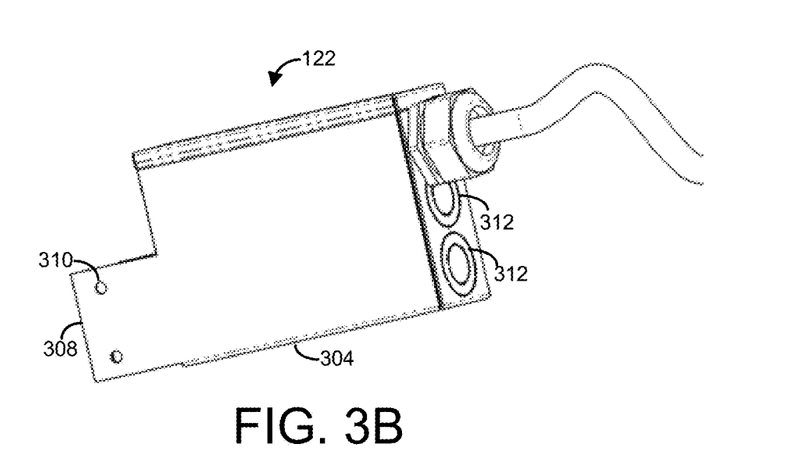

FIGS. 3A and 3B illustrate various aspects of the adapter 222 of FIGS. 2A and 2B that has been removed from the power distribution member 220 according to one embodiment of the present disclosure. The adapter 222 includes an electrical power cord 204 coupled to a housing 304 with a connector 306. The housing 304 provides a relatively rigid structure for securing the connector 206 with its complementary connector configured on the power distribution member 220, and may be made of any suitable material, such as metal. The housing 304 may also include flanges 308 configured with holes 310 for insertion of screws to secure the housing 304 to the power distribution member 220.

In one embodiment, the first connector includes a keying mechanism to ensure that the second connector is restricted to physically mating with the first connector in a specified orientation. In the particular example shown, the keying mechanism is provided by the flanges 308 that only allows mating of the adapter 222 with the power distribution member 220 in one orientation. Nevertheless, other embodiments contemplate that other keying mechanisms may be used, such as one or more blind pins configured in the connector 306 that restrict coupling with the connector configured on the power distribution member 220 when coupling is attempted in a non-specified orientation.

In one embodiment, the housing 304 also includes one or more perforated regions 312, commonly referred to as knockouts that allow one or more holes to be placed in the housing according to the type of electrical power the adapter 222 is to be configured for. For example, when the adapter 222 is to be configured to support a 60 ampere, three phase electrical power source that is typically provided by a single cord, only one perforated region 312 may be removed for insertion of the single cord. As another example, when the adapter 222 is to be configured to support two 30 ampere, three phase electrical power sources, two of the perforated regions may be removed so that the two cords may be inserted into the housing 304. In general, any suitable quantity of perforated regions 312 may be provided to support any corresponding quantity of cords for the adapter 222.

Figure 4:
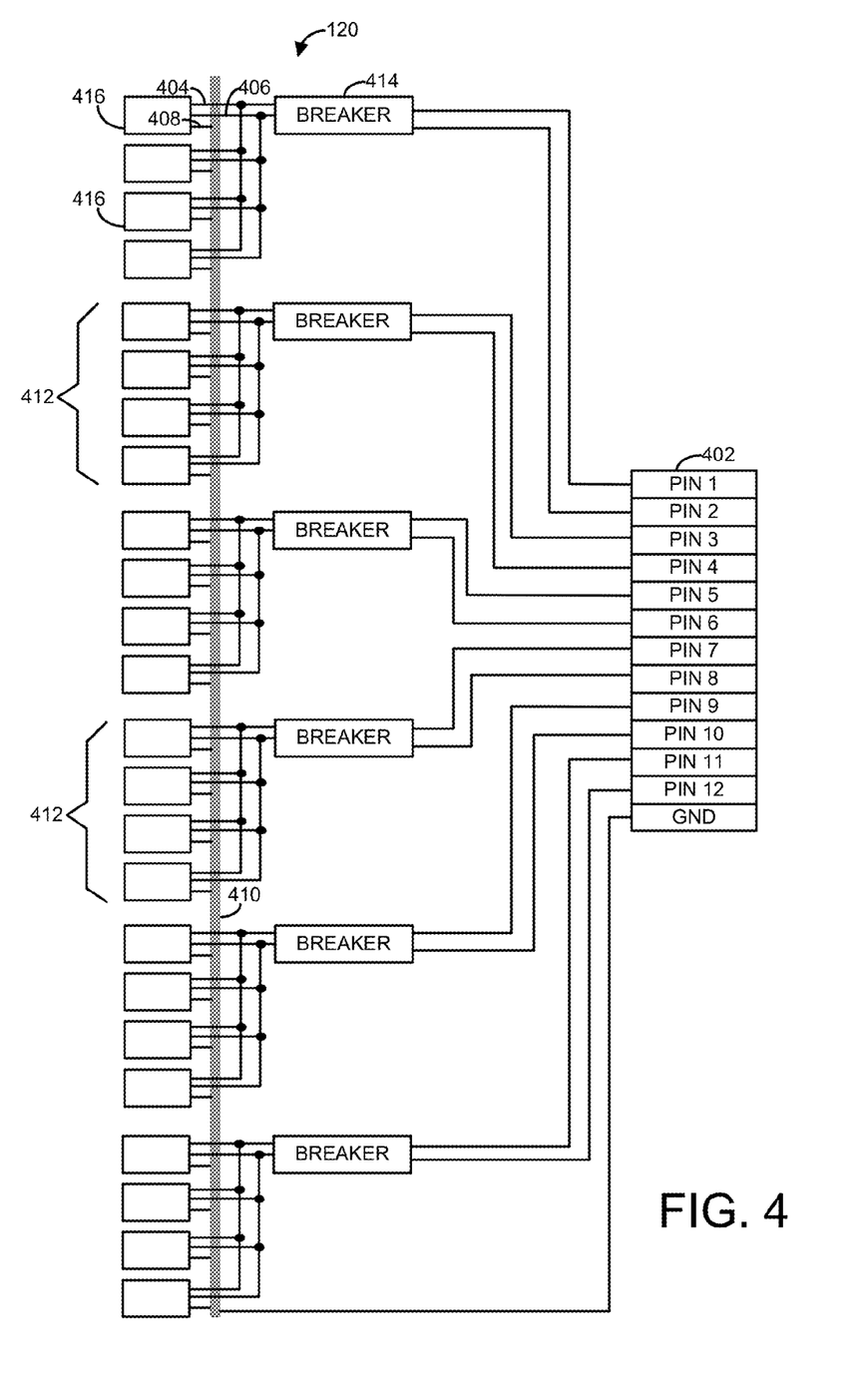
FIG. 4 illustrates an example schematic diagram the power distribution member according to one embodiment of the present disclosure.

FIG. 4 illustrates an example schematic diagram the power distribution member 120 according to one embodiment of the present disclosure. The power distribution member 120 includes a connector 402 that is electrically coupled to multiple power outlets 416. The power outlets 416 as shown are NEMA 5 connectors; however, any suitable type of power outlet may be used. Each power outlet 416 has a hot conductor 404, a neutral conductor 406, and a ground conductor 408. The ground conductor 408 is electrically coupled to a ground strip 410 that may extend throughout the length of the power distribution member 120 and is electrically coupled to a ground (GND) contact of the connector 402.

The power outlets 416 are arranged in groups 412 of four power outlets in which the hot conductors 404 and neutral conductors 406 from each group 412 are interconnected to provide a single node to independent contacts of the connector 402. A circuit breaker 414 may also be provided at each node for circuit protection of its respective group 412.

FIGS. 5A through 5F illustrate schematic diagrams of several adapters 500 used to support corresponding various electrical power source types according to one embodiment of the present disclosure. In general, the adapters of FIGS. 5A through 5F are configured to convert a specified type of electrical power to that of the power outlets, which in this particular example, is a 30 ampere, single phase electrical power for the power outlets 416. Each adapter 500 has a connector 502 with contacts that interconnect with complementary contacts of the connector 402 of the power distribution member 120 when the adapter 122 is releasably secured to the power distribution member 120.

Figure 5A:
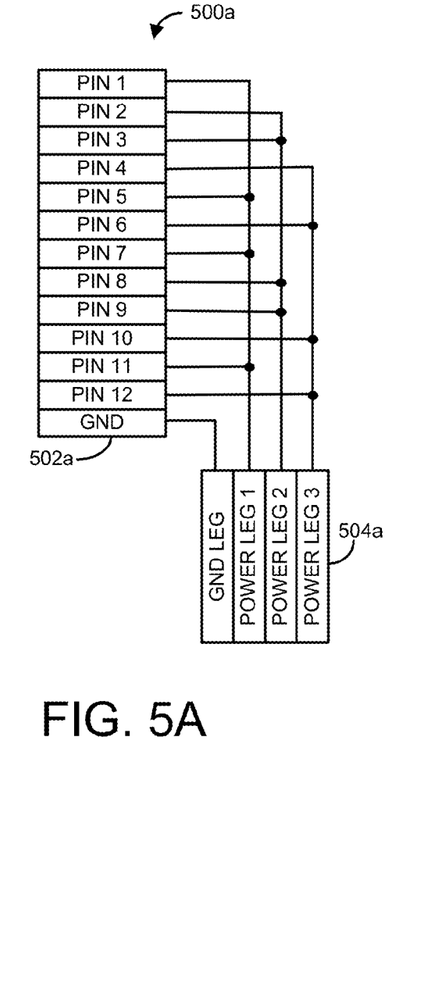
FIGS. 5A through 5F illustrate schematic diagrams of several adapters used to support corresponding various electrical power source types according to one embodiment of the present disclosure.

The adapter 500a of FIG. 5A is configured to support a type of electrical power provided by a 60 ampere, three phase delta power source 504a. As shown, the 60 ampere, three phase delta power source 504 has a first power leg (power leg 1) that is connected to pins 1, 5, 7, and 11 of the connector 502a, a second power leg (power leg 2) that is connected to pins 2, 3, 8, and 9 of the connector 502a, and a third power leg (power leg 3) that is connected to pins 4, 6, 10, and 12 of the connector 502a. Additionally, the three phase delta power source 504 has a ground leg (GND leg) that is connected to pin 13 of the connector 502a. In some embodiments, pin 13 of the connector 502a may be a conductive shield or other conductive housing, such as the housing 304 of the adapter 122.

Figure 5B:
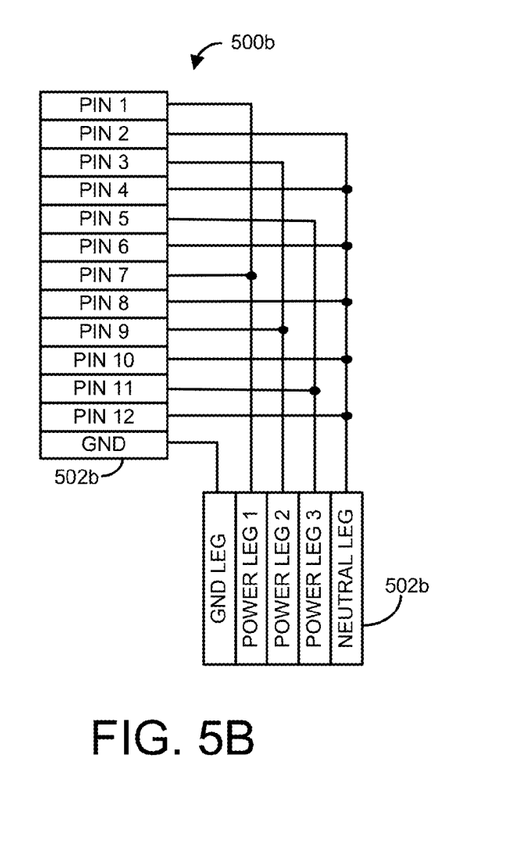

The adapter 500b of FIG. 5B is configured to support a type of electrical power provided by a 32 ampere, three phase wye power source 504b. The 32 ampere, three phase wye power source 504b has a first power leg (power leg 1) that is connected to pins 1 and 7 of the connector 502b, a second power leg (power leg 2) that is connected to pins 3 and 9 of the connector 502b, and a third power leg (power leg 3) that is connected to pins 5 and 11 of the connector 502b. The 32 ampere, three phase wye power source also has a neutral leg (neutral) that is connected to pins 2, 4, 6, 8, 10, and 12 of the connector 502b. Additionally, the three phase wye power source 504b may have a ground leg (GND leg) that is connected to pin 13 of the connector 502b or other suitable grounding structure, such as the housing 304 of the adapter 500b.

Figure 5C:
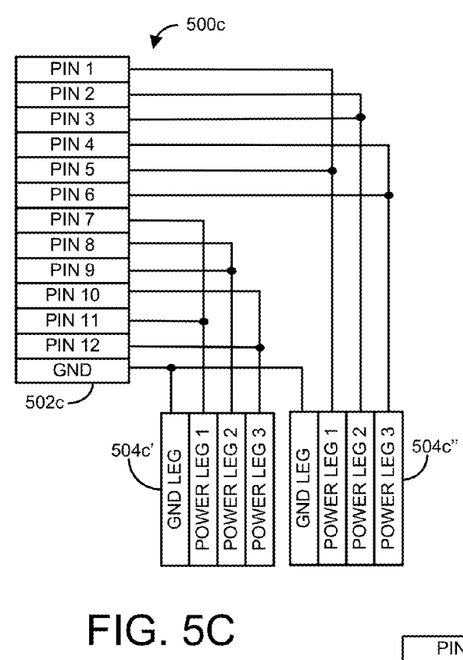

The adapter 500c of FIG. 5C is configured to support a type of electrical power provided by two 30 ampere, three phase, delta power sources 504c. A first 30 ampere, three phase, delta power source 504c' has a first power leg (power leg 1) that is connected to pins 1 and 5 of the connector 504c, a second power leg 504c" that is connected to pins 2 and 3 of the connector 502c, and a third power leg 504c''' that is connected to pins 4 and 6 of the connector 502c. A second 30 ampere, three phase, delta power source 504c" has a first power leg (power leg 1) that is connected to pins 7 and 11 of the connector 502c, a second power leg (power leg 2) that is connected to pins 8 and 9 of the connector 502c, and a third power leg (power leg 3) that is connected to pins 10 and 12 of the connector 502c. Each of the power sources 502c may also have a ground leg (GND leg) that is connected to pin 13 of the connector 502c or other suitable grounding structure, such as the housing 304 of the adapter.

Figure 5D:
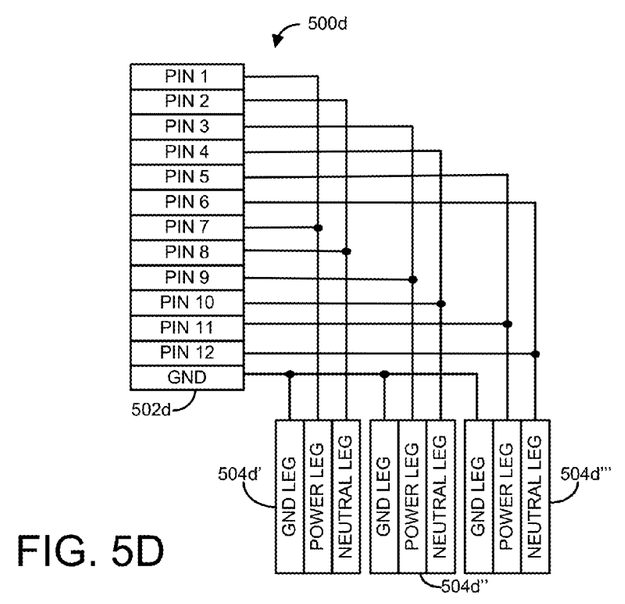

The adapter 500d of FIG. 5D is configured to support a type of electrical power provided by three 30 ampere, single phase power sources 504d. A first 30 ampere, single phase power source 504d' has a hot leg that is connected to pins 1 and 7 of the connector 502d, and a neutral leg that is connected to pins 2 and 8 of the connector 502d. A second 30 ampere, single phase power source 504d" has a hot leg that is connected to pins 3 and 9 of the connector 502d, and a neutral leg that is connected to pins 4 and 10 of the connector 502d. A third 30 ampere, single phase power source 504d''' has a hot leg that is connected to pins 5 and 11 of the connector 502d, and a neutral leg that is connected to pins 6 and 12 of the connector 502d. Each of the power sources 504d may also have a ground leg (GND leg) that is connected to pin 13 of the connector 502d or other suitable grounding structure, such as the housing 304 of the adapter.

Figure 5E:
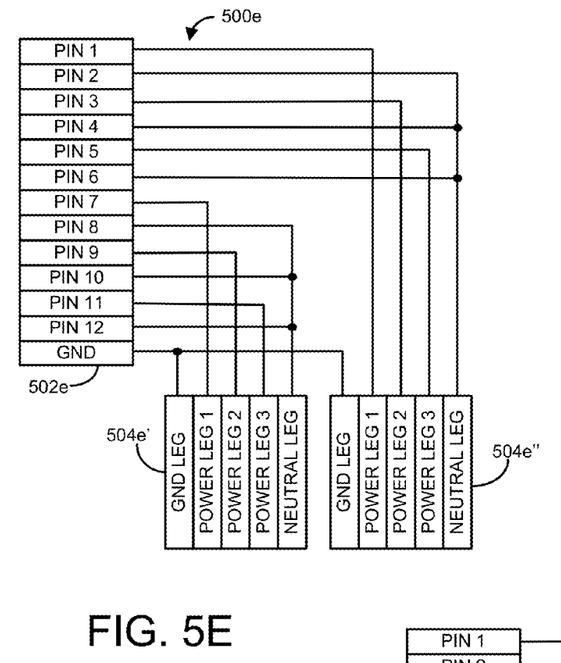

The adapter 500e of FIG. 5E is configured to support a type of electrical power provided by two 16 ampere, three phase, wye power sources 504e. A first 16 ampere, three phase, wye power source 504e' has a first power leg (power leg 1) that is connected to pin 1 of the connector 502e, a neutral power leg that is connected to pins 2, 4, and 6 of the connector 502e a second power leg (power leg 2) that is connected to pin 3 of the connector 502e, and a third power leg (power leg 3) that is connected to pin 5 of the connector 502e. A second 16 ampere, three phase, wye power source 504e" has a first power leg (power leg 1) that is connected to pin 7 of the connector 502e, a neutral power leg that is connected to pins 8, 10, and 12 of the connector 502e, a second power leg (power leg 2) that is connected to pin 9 of the connector 502e, and a third power leg (power leg 3) that is connected to pin 11 of the connector 502e. Each of the power sources 504e may also have a ground leg (GND leg) that is connected to pin 13 of the connector 502e or other suitable grounding structure, such as the housing 304 of the adapter.

Figure 5F:
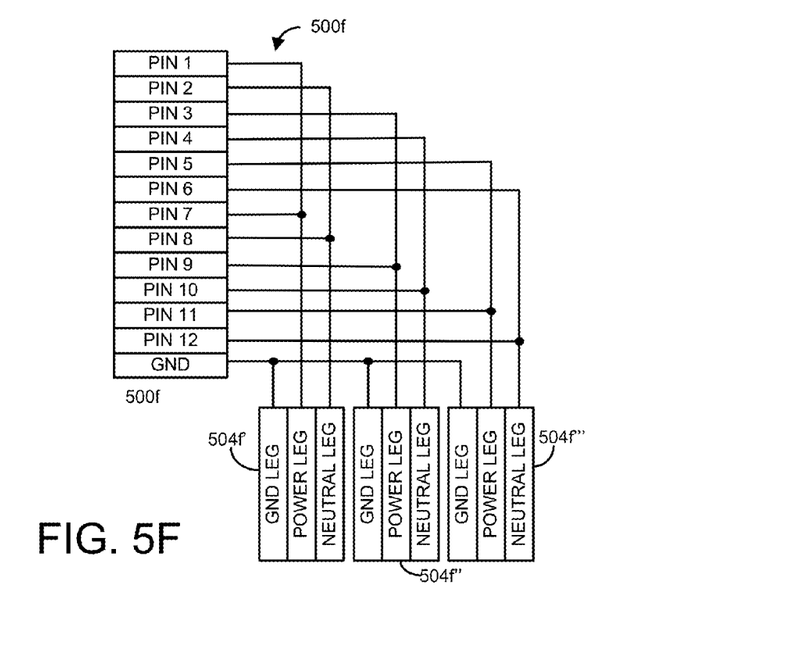

The adapter 500f of FIG. 5F is configured to support a type of electrical power provided by three 32 ampere, single phase power sources 504f. A first 32 ampere, single phase power source 504f' has a hot leg that is connected to pins 1 and 7 of the connector 502f, and a neutral leg that is connected to pins 2 and 8 of the connector 502f. A second 32 ampere, single phase power source 504f" has a hot leg that is connected to pins 3 and 9 of the connector 502f, and a neutral leg that is connected to pin 4 and 10 of the connector 502f. A third 32 ampere, single phase power source 504f''' has a hot leg that is connected to pins 5 and 11 of the connector 502f, and a neutral leg that is connected to pins 6 and 12 of the connector 502f. Each of the power sources 502f may also have a ground leg (GND leg) that is connected to pin 13 of the connector 502f or other suitable grounding structure, such as the housing 304 of the adapter.

As shown in each of the above adapter configurations, the legs of each of the power sources is connected in a manner that allows loading from each of the groups 412 of power outlets 416 to be spread in a relatively even manner. Embodiments incorporating such a modular configurations may provide certain advantages not heretofore recognized by the prior art. For example, the groups of power outlets 416 may be used for enhanced redundancy by coupling a first set of equipment devices to a first group 412 of power outlets 416, and coupling a second set of other equipment devices providing redundancy to the first set of equipment devices such that the second set of equipment devices may off load (e.g., replace) the processes performed by the first equipment devices in the event that power is lost to the first group 412 of power outlets 416 (e.g., by activation of a circuit breaker). Additionally, the arrangement of power outlets 416 in groups 128 may provide an efficient technique to de-activate (e.g., remove power) certain sets of equipment devices for various reasons, such as periodic maintenance.

Figure 6:
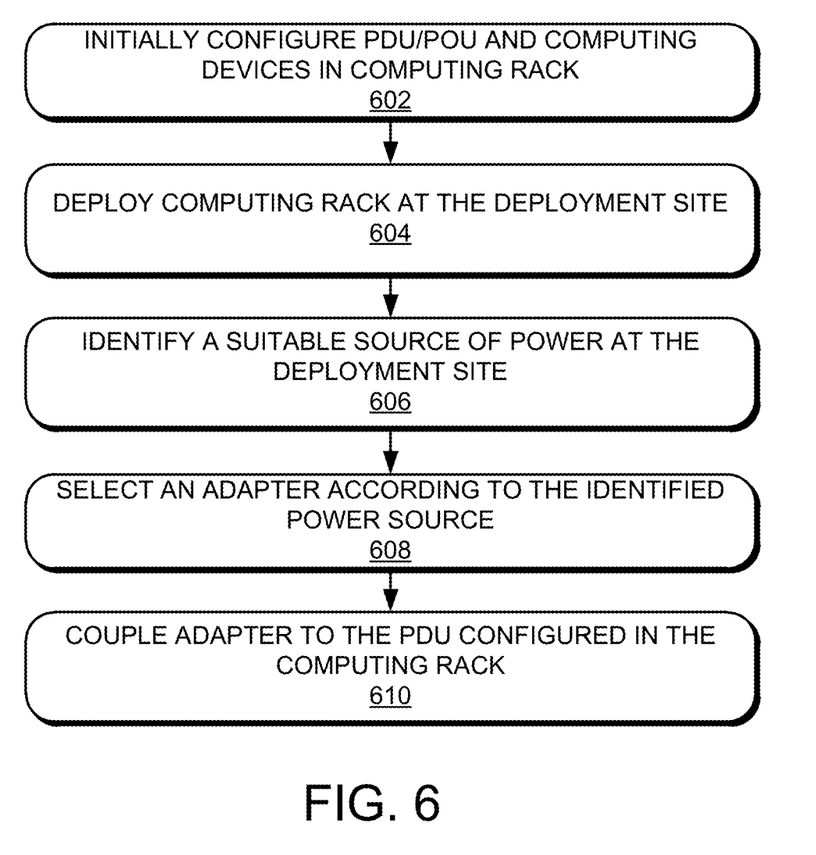
FIG. 6 illustrates an example process that may be performed to provide electrical power to the computer equipment devices configured in an equipment rack according to one embodiment of the present disclosure.

FIG. 6 illustrates an example process that may be performed to provide electrical power to the equipment devices configured in an equipment rack 102 according to one embodiment of the present disclosure.

In step 602, a distributed computing system is initially configured by installing a power distribution member 120 in an equipment rack 102 and the equipment rack populated with multiple equipment devices. The equipment devices may be any device that is used in support of the overall distributed computing system. For example, the equipment devices may include processing devices, such as personal computers, rack-mounted computers, communication devices, such as routers, switches, and/or hubs, and other ancillary equipment, such as fans, heaters, or environmental control systems. The initially configured distributed computing system is then shipped to a deployment site where it will be placed in service in step 604.

In step 606, a suitable power source may then be identified at the service site. For example, it is known that certain locations around the world have power configurations that have been standardized for their particular region, such as the United States which normally provides power sources have a delta phase configuration, or Europe which normally provides power sources having a three phase wye configuration. Thus, an appropriate adapter 122 may be selected for adapting the available power source to a form suitable for use by the distributed computing system at step 608.

In one aspect, multiple adapters 500 of differing types may be selected for powering the computer equipment devices from differing power sources. For an example in which at least two scalable PDU/POUs 100 are provided in the equipment rack 102, one scalable PDU/POU 100 may be configured to be powered from a nearby utility company that provides a three phase delta configuration, while the other scalable PDU/POU 100 is to be powered from an emergency power source, such as a gas-powered generator that provides single phase electrical power. Thus, the first scalable PDU/POU 100 may be configured with a three phase delta configuration adapter as shown in FIG. 5A, while the second scalable PDU/POU 100 is configured with a single phase configuration adapter as shown in FIG. 5F.

In step 610, the selected adapter 122 is then coupled to the power distribution member 120 such that power may be applied to the equipment devices of the computing system. Nevertheless, when use of the computing system is no longer needed or desired, the process ends.

Although FIG. 6 describes one example of a process that may be performed for configuring a computing system with power provided by the scalable PDU/POU 100, it should be understood that other processes may be performed without departing from the spirit or scope of the present disclosure. For example, the equipment rack 102 may be fully populated with power distribution members 120 or partially populated with a subset of power distribution members 120 prior to being shipped to its service site. Additionally, the adapter 122 may be initially configured on the power distribution members 120 prior to being shipped to the service site.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A power unit comprising:
a power distribution member configured to be deployed in an equipment rack of a distributed computing system, the power distribution member comprising:
a plurality of power outlets to provide electrical power at a first current rating and phase type configuration; and
a first connector having a plurality of first electrical contacts that are electrically coupled to the power outlets; and
an interchangeable adapter to be physically coupled to the power distribution member, the interchangeable adapter comprising:
a second connector electrically removably coupled to the first connector, the second connector having a plurality of second contacts that are arranged to mate with certain ones of the first electrical contacts such that at least two electrical power sources having a second current rating and phase type configuration are provided to the power outlets at the first current rating and phase type configuration, the first current rating and phase type configuration being different from the second current rating and phase type configuration.

2. The power unit of claim 1, wherein the first connector comprises a keying mechanism to ensure that the second connector is restricted to physically mating with the first connector in a specified orientation.

3. The power unit of claim 1, wherein the interchangeable adapter is configured to be physically coupled to the power distribution member proximate a location selected from the list consisting of a bottom portion of the equipment rack, a top portion of the equipment rack, and a middle portion of the equipment rack.

4. The power unit of claim 1, wherein the power outlets are arranged in a plurality of groups in the equipment rack.

5. The power unit of claim 1, wherein the second current rating and phase type configuration comprises at least one of a 60 ampere three phase delta configuration, a 32 ampere a three phase wye configuration, a plurality of 30 ampere three phase delta configurations, a plurality of 30 ampere, single phase configurations, a plurality of 16 ampere three phase wye configurations, and a plurality of 32 ampere single phase configurations.

6. The power unit of claim 1, wherein the power unit comprises one of a plurality of power units disposed in the equipment rack.

7. The power unit of claim 1, wherein the interchangeable adapter comprises one or more perforated regions that allow passage of one or more cords of at least one of the two electrical power sources.

8. The power unit of claim 1, wherein the interchangeable adapter is releasably coupled to the power distribution member using at least one of screws, a snap fit mechanism, a friction fit mechanism, or a sliding engagement mechanism.

9. A distributed computing system comprising:
a plurality of equipment devices that executes a plurality of virtual objects in a virtualized computing environment housed in an equipment rack; and
a power unit deployed in the equipment rack, the power unit comprising:
a power distribution member configured to be deployed in the equipment rack, the power distribution member comprising:
a plurality of power outlets to provide electrical power to a plurality of devices disposed in the equipment rack at a first current rating and phase type configuration; and
a first connector having a plurality of first electrical contacts that are electrically coupled to the power outlets; and
an interchangeable adapter to be physically coupled to the power distribution member, the interchangeable adapter comprising:
a second connector electrically removably coupled to the first connector, the second connector having a plurality of second contacts that are arranged to mate with certain ones of the first electrical contacts such that at least two electrical power sources having a second current rating and phase type configuration are provided to the power outlets at the first current rating and phase type configuration, the first current rating and phase type configuration being different from the second current rating and phase type configuration.

10. The distributed computing system of claim 9, wherein the first connector comprises a keying mechanism to ensure that the second connector is restricted to physically mating with the first connector in a specified orientation.

11. The distributed computing system of claim 9, wherein the interchangeable adapter is configured to be physically coupled to the power distribution member proximate a location selected from the list consisting of a bottom portion of the equipment rack, a top portion of the equipment rack, and a middle portion of the equipment rack.

12. The distributed computing system of claim 9, wherein the power outlets are arranged in a plurality of groups in the equipment rack.

13. The distributed computing system of claim 9, wherein the second current rating and phase type configuration comprises at least one of a 60 ampere three phase delta configuration, a 32 ampere three phase wye configuration, a plurality of 30 ampere three phase delta configurations, a plurality of 30 ampere single phase configurations, a plurality of 16 ampere three phase wye configurations, and a plurality of 32 ampere single phase configurations.

14. The distributed computing system of claim 9, further comprising a plurality of the power units deployed in the equipment rack.

15. The distributed computing system of claim 9, wherein the interchangeable adapter comprises one or more perforated regions that allow passage of one or more cords of at least one of the two electrical power sources.

16. The distributed computing system of claim 9, wherein the interchangeable adapter is releasably coupled to the power distribution member using at least one of screws, a snap fit mechanism, a friction fit mechanism, a sliding engagement mechanism.

17. A distributed computing system comprising:
- a plurality of equipment devices that executes a plurality of virtual objects in a virtualized computing environment housed in an equipment rack; and
- a plurality of power units deployed in the equipment rack, each power unit comprising:
  - a power distribution member configured to be deployed in the equipment rack, the power distribution member comprising:
    - a plurality of power outlets to provide electrical power to a plurality of devices disposed in the equipment rack at a first current rating and phase type configuration, wherein the power outlets are arranged in a plurality of groups in the equipment rack; and
    - a first connector having a plurality of first electrical contacts that are electrically coupled to the power outlets; and
  - an interchangeable adapter to be physically coupled to the power distribution member proximate a bottom portion of the equipment rack, the interchangeable adapter comprising:
    - a second connector electrically removably coupled to the first connector, the second connector having a plurality of second contacts that are arranged to mate with certain ones of the first electrical contacts such that at least two electrical power sources having a second current rating and phase type configuration are provided to the power outlets at the first current rating and phase type configuration, the first current rating and phase type configuration being different from the second current rating and phase type configuration; and
    - a keying mechanism to ensure that the second connector is only allowed to physically mate with the first connector in a specified orientation.

18. The distributed computing system of claim 17, wherein the second current rating and phase type configuration comprises at least one of a 60 ampere, three phase delta configuration, a 32 ampere, three phase wye configuration, two 30 ampere, three phase delta configurations, three 30 ampere, single phase configurations, two 16 ampere, three phase wye configurations, and 32 ampere, single phase configurations.

19. The distributed computing system of claim 17, wherein the interchangeable adapter is releasably coupled to the power distribution member using at least one of screws, a snap fit mechanism, a friction fit mechanism, a sliding engagement mechanism.

* * * * *